(12) United States Patent
Costa et al.

(10) Patent No.: US 8,872,622 B2
(45) Date of Patent: Oct. 28, 2014

(54) AUTHENTICATION OF "SOURCE" FOR BRANDS

(75) Inventors: Pasquale Vincent Costa, Concord, MA (US); Ernest G. Henrichon, Jr., Bedford, NH (US); Curtis W. Howes, Harvard, MA (US); Eric P. Johanson, Sandown, NH (US)

(73) Assignee: Valmarc Corporation, Needham, MA (US)

( * ) Notice: Subject to any disclaimer, the term of this patent is extended or adjusted under 35 U.S.C. 154(b) by 511 days.

(21) Appl. No.: 12/927,809

(22) Filed: Nov. 24, 2010

(65) Prior Publication Data

US 2011/0211727 A1    Sep. 1, 2011

Related U.S. Application Data

(63) Continuation-in-part of application No. 11/728,794, filed on Mar. 27, 2007, now Pat. No. 7,852,195.

(51) Int. Cl.
*G08B 21/00* (2006.01)

(52) U.S. Cl.
USPC ............................................. 340/5.8; 705/59

(58) Field of Classification Search
USPC ............................. 340/572.1, 5.8; 705/51, 59
See application file for complete search history.

(56) References Cited

U.S. PATENT DOCUMENTS 5,585,616 A * 12/1996 Roxby et al. ............. 235/462.06
2005/0273434 A1 * 12/2005 Lubow ............................ 705/59

* cited by examiner

*Primary Examiner* — Jeffery Hofsass
(74) *Attorney, Agent, or Firm* — Morris I. Pollack

(57) ABSTRACT

A unique identifier and Authentication System is created to Authenticate to interested parties the BRAND "SOURCE" of: articles (such as clothing, accessories, jewels, fragrances, manufactures, etc.); of authorized dealers for such articles (wholesalers, retailers, etc.); of authorized service entities for such articles: and for the like; of the BRAND "SOURCE" which the provider of the article desires to authenticate its Brand source to the party acquiring the article(s) to substantiate to that acquiring party that they are receiving a genuine article and/or dealing with a "SOURCE" authorized entity. The Authentication System accommodates not only camera enabled imagers and hard wiring but also camera enabled smart phones and internet communications. In addition to responding, in real time, to Authentication Inquiries the system establishes a communication link between the "SOURCE" and the inquirer for marketing and other APP like matters.

25 Claims, 10 Drawing Sheets

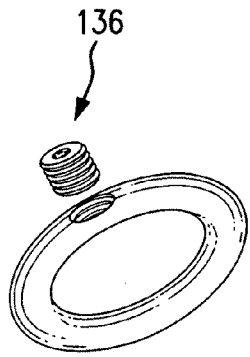
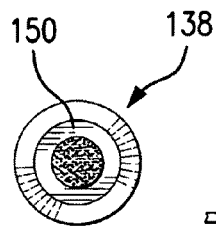
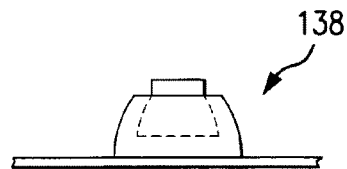
FIG. 9  FIG. 10  FIG. 11
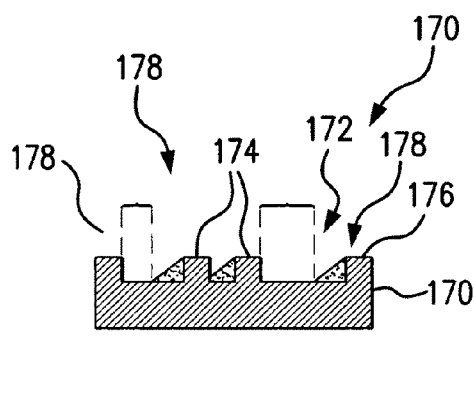
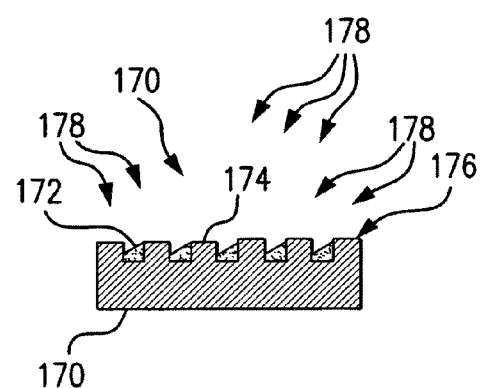
FIG. 12  FIG. 13
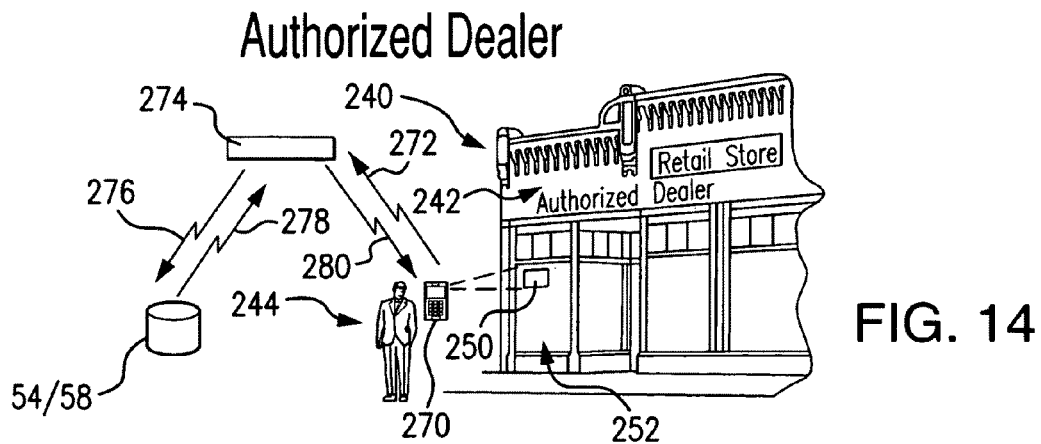
FIG. 14

Brand Name and Logo

To confirm authorized dealer status, for more info, and for valuable *discounts*

- Instructions
- For
- Use        284
- Are
- Printed
- On
- Authentication
- Display

FIG. 15

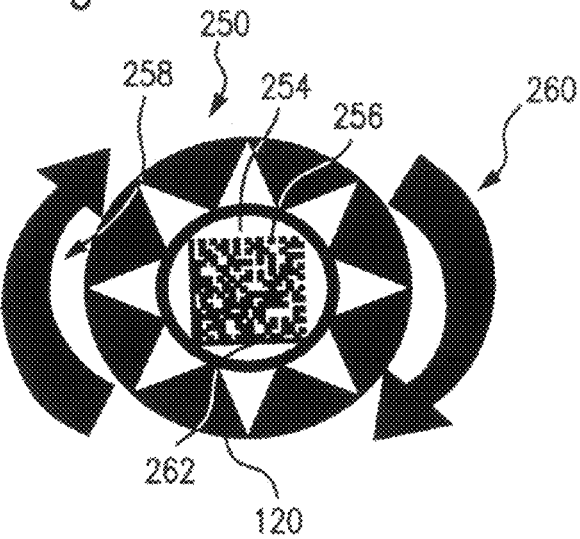

Authorized Dealer AND SERVICE FACILITY

To confirm authorized dealer status, for more info, and for valuable *discounts*

- Instructions
- For
- Use         286
- Are
- Printed
- On
- Authentication
- Display

| Brand Name and Logo 1 |
| Brand Name and Logo 2 |
| Brand Name and Logo 3 |
| Brand Name and Logo 4 |
| Brand Name and Logo 5 |

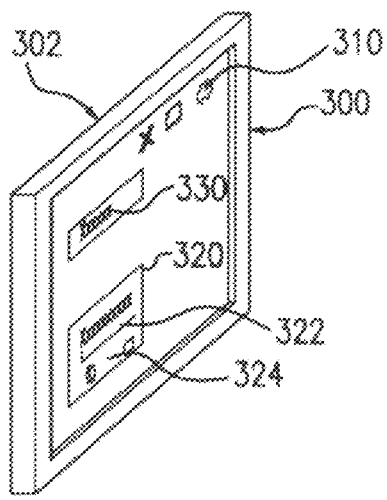

FIG. 17

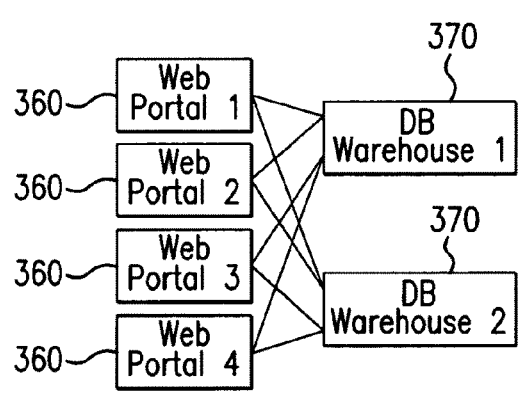 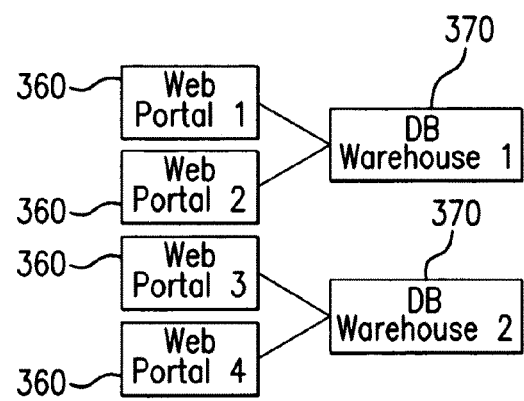
FIG. 21                    FIG. 22

AUTHENTICATION OF "SOURCE" FOR BRANDS

This application is a continuation in part of patent application Ser. No. 11/728,794 filed on Mar. 27, 2007 now U.S. Pat. No. 7,852,195 and assigned to the assignee of this application.

BACKGROUND OF THE INVENTION

1. Field of Application

This invention relates to authentication of the "SOURCE" of BRANDS, and, more particularly, to a System and components for globally and readily providing "SOURCE" authentication for BRANDS.

2. Description of the Prior Art

A BRAND is something a supplier of goods and/or services associates with their goods and/or services to indicate that they are the "SOURCE" for those intending to acquire such goods and/or avail themselves of such services and to distinguish their goods and/or services from those of competitors.

A BRAND (often otherwise sometimes referred to as a trademark, or service mark) may comprise any word, name, phrase, symbol, design or device or any combination of words, names, phrases, symbols, designs or devices which identifies and distinguishes the "SOURCE" (such as the manufacturer, retailer, provider, etc.) of the goods or services of one entity from those of another entity.

BRANDS are used by an entity, in connection with a product or products, or service or services, to help consumers (actual or intended purchasers, and/or users) select the particular product(s) and/or service(s) that are provided by a selected entity that the respective consumer prefers to be the "SOURCE" (owner, licensee, provider, manufacturer, wholesaler, retailer, etc) for a particular product, or service. The BRAND thus distinguishes the selected product, or service, from the products, or services, of competitors that the consumer does not desire to be the provider. BRANDS indicate to consumers that a product, or service, comes from a "SOURCE", even if the name of the "SOURCE" is unknown to the consumer. BRANDS also function to indicate quality and reputation, thus creating good will in the proprietor (owner, "SOURCE") of the BRAND and BRANDED product and/or service.

Many entities or parties (corporations, partnerships, individuals, associations, etc.) spend considerable amounts, possibly millions, in advertising and other marketing efforts to create at least one, and possibly many, BRAND names; and to generate good will in and to each and every BRAND name and "SOURCE". In some cases, further amounts (here again possibly millions) are often spent in developing products and/or services to be marketed under such BRAND names. Successful BRAND names represent a valuable asset of an entity (as the "SOURCE" of the BRAND), and are often the focus of great efforts undertaken to police the proper and authorized use of such BRAND names. Despite such efforts, successful BRAND names have been wrongfully exploited for years by unscrupulous parties such as illegal manufacturers and resellers of counterfeit and/or stolen and diverted products attempting to hood-wink the public into thinking that the goods and/or services emanate from the true "SOURCE". High price luxury type goods in particular have been, and continue to be, subjected to widespread counterfeiting, theft and diversion. The unauthorized display of "AUTHORIZED" dealer, servicer, etc., and the like, at a place of business, in phone directories, advertising, on web sites and/or other business endeavors has also proven to be detrimental to a BRAND "SOURCE"s reputation and income.

The legitimate use of BRANDS (trademarks and service marks) benefits the consuming public as well as the merchant or manufacturer of a product, or provider of a service. For the merchant or manufacturer, each BRAND may serve as an advertising tool, facilitating repeat sales and the successful marketing of new products and services by the BRAND "SOURCE". Individual consumers rely on BRANDS to distinguish among competing products, services and BRAND "SOURCES", and to represent a certain level of quality they have come to expect when purchasing products or services with which a particular BRAND is used or emanating from a particular BRAND "SOURCE". By protecting BRANDS, several broader goals are furthered as well. BRANDS foster competition and the maintenance of quality by securing to the provider (the BRAND "SOURCE") the benefits of good reputation. Protecting BRANDS also serves to guard the public from inadvertent or intentional use of confusing or misleading BRANDS.

The actual lost sales and profits, and loss of taxes to governments, attributed to wrongful activities (counterfeiting, theft, diversion, knock-offs, etc.) is but one aspect of the problem. An often more serious result is the damage done to the good name and reputation of the BRAND owner ("SOURCE") especially when inferior counterfeited merchandise is sold as genuine. In an effort to counteract the problem, BRAND name owners often aggressively pursue counterfeiters, and introduce programs intended to eliminate or at least reduce such illegal activities. While some programs have met rather limited short term success, the end rewards to the wrongdoers are often so large that the programs themselves have been copied.

According to one such program, BRAND authenticating holographs are incorporated into either the product packaging or a swing tag, or placed on the packaging or product in the form of a self-adhesive decal. While once considered a novel and innovative approach, holograph technology is now well known, and the cost of entry into the holograph manufacturing industry is low. In today's market, counterfeit holographs are commonplace. Thus the use of holograms has not proved effective to stem the problem, especially for the consumer at the time and point of sale, In another anti-counterfeiting program, a hidden authenticating device (such as one that incorporates RFID technology, or special threads or a chemical) is incorporated into the product. This approach is problematic, as it is generally difficult to control and lacks standardization with regard to where to place the device. While the hidden device is detectable by field inspectors checking a reseller's inventory, consumers are generally unaware of the device, and whether or not the BRAND "source" of the merchandise is genuine and authenticated as such. A still further approach uses moving image labels (including 3D) typically manufactured with a paper printing image including PVC reflectors. This method, however, is often unsuitable for the intended goods or services. Furthermore, the technology is well known, thus leading to the same problems realized from holographs.

Some programs utilize a multi-layer approach to product security with both overt and covert types of identifiers incorporated into the product and/or its packaging. However not only does this add unacceptably to the product cost but it does not seem to provide a consumer with BRAND "source" authentication, especially at the time and point of sale.

The use of serial numbers to track, and hopefully control, product security has proved helpful for vehicles as VIN (Vehicle Identification) Numbers, and also for product warranty purposes. But, serial numbering alone does not seem to be an effective BRAND "source" authenticator for the consumer as they do not currently have ready access to the identifying data base, or any indicator that authentication is available to them, at the time and point of sale. Systems, such as those shown in U.S. Pat. No. 5,521,815 for "Uniform System For Verifying and tracking Articles of Value" and in U.S. Pat. No. 6,076,064 for "Uniform System For Verifying And Tracking The Title of Articles or Objects of Value" are further examples of complex and expensive product security systems that require access to data bases, through computer terminals, to verify product security and would prove cumbersome to a consumer at the time and place of sale and, as such unacceptable.

U.S. Pat. No. 6,099,930 for "Methods and Marking Digital Compact Discs As A Means To Determine its authenticity" utilizes near infrared flurophores; but, requires a protective cover layer which would not only be unacceptably detrimental to the aesthetics of the product but might, as well, be unusable for items of jewelry and the like. U.S. Pat. No. 6,533,180 for "Security Label and Method of Use" also only provides an obtrusive and unacceptable label that must be attached to the product; while U.S. Pat. No. 6,578,112 requires special buttons with a complex and relatively expensive sewing machine to attach the buttons with a relatively complex stitch. In addition none of available systems serve to establish communication between the party seeking authentication of the BRAND and the BRAND "SOURCE" for purposes of marketing the same and other products and/or services of the BRAND "SOURCE" and otherwise provide to the BRAND "SOURCE" information pertinent to the whereabouts and product and other interests, and biographic information, of the party making the inquiry.

SUMMARY OF THE INVENTION

Therefore, it is an object of the invention to provide a new and novel BRAND "SOURCE" authenticating, system, method, and unique identifier.

It is another object of the invention to provide a new and novel authenticity identifier, system, method and components for authenticating the "SOURCE" of BRANDED articles.

It is another object of the invention to provide a new and novel BRAND "SOURCE" authenticating system which utilizes a specially and uniquely designed BRAND "SOURCE" identifier to be visually displayed so as to be easily and obviously located and to readily enable determination of a BRAND "SOURCE" for the article or service.

It is another object of the invention to provide a new and novel BRAND "SOURCE" authentication system which utilizes a specially and uniquely designed BRAND "SOURCE" unique identifier to be carried by an article or displayed at a place of sale or service so as to be easily and obviously located, especially by a consumer at the time and point of sale and/or service.

It is another object of the invention to provide a new and novel BRAND "SOURCE" authentication system wherein a BRAND "SOURCE" identifier is uniquely encoded and provided under authority of the BRAND "SOURCE" to indicate to an inquiring party the authentic and legitimate "SOURCE" of a BRAND.

It is another object of the invention to provide a new and novel BRAND "SOURCE" authentication system wherein a unique identifier may be displayed and queried to verify that a provider of articles and/or services is, in fact, authorized by a BRAND "SOURCE" to be such an AUTHORIZED PROVIDER;

It is another object of the invention to provide a new and novel BRAND "SOURCE" authentication system wherein a unique identifier may be displayed and queried by use of an electronic device such as a camera of a cell phone, smart phone or other electronic device to verify that a provider of articles and/or services is, in fact, authorized by a BRAND "SOURCE" to be such an AUTHORIZED PROVIDER;

It is another object of the invention to provide a new and novel BRAND "SOURCE" authentication system wherein a unique identifier may be displayed and queried through the use of an electronic device such as a camera of a camera equipped cell phone, smart phone, or the like, to verify, in real time through the device and/or the internet, that a provider of articles and/or services is, in fact, authorized by a BRAND "SOURCE" to be such an AUTHORIZED PROVIDER;

It is another object of the invention to provide a new and novel BRAND "SOURCE" authentication system wherein the BRAND "SOURCE" unique identifier may also include or be associated with, or be in proximity to, a BRAND of the BRAND "SOURCE" authenticator.

It is another object of the invention to provide a new and novel BRAND "SOURCE" authentication system wherein symbology encoded unique identifiers are supplied in sets to BRAND owners, and/or their designee(s), who would thereafter be in control of the further use of the identifiers.

It is another object of the invention to provide a new and novel BRAND "SOURCE" authentication system wherein symbology encoded, BRAND "SOURCE" identifiers, each uniquely encoded, and which may, or may not, also be encrypted, to provide identification and authenticity, are supplied to Brand owners, who would then control further use of the identifiers.

It is another object of the invention to provide a new and novel BRAND "SOURCE" authentication system wherein symbology encoded unique identifiers are supplied in sets, with each identifier in the set serially numbered, and/or randomly numbered, to the BRAND "SOURCE", who would then control their further use.

It is another object of the invention to provide a new and novel BRAND "SOURCE" authentication system which readily identifies BRAND "SOURCE" may also provide other characteristics and/or information pertinent to the BRANDED product and/or service.

It is another object of the invention to provide a new and novel BRAND "SOURCE" authentication system which promotes support by subjecting pirates to multiple legal causes of action.

It is another object of the invention to provide a new and novel BRAND "SOURCE" authentication system which has a centralized control and supply of unique identifiers.

It is another object of the invention to provide a new and novel BRAND "SOURCE" authentication system which has a centralized control and supply of unique identifiers and wherein that central control stores the unique identifier information and must be queried to authenticate the BRAND "SOURCE".

It is yet another object of this invention to provide a new and novel BRAND "SOURCE" authentication system wherein encoded symbology, is utilized for uniquely encoded identifiers, that are applied to authenticate BRAND "SOURCE", and may be imaged by any device with a CCD or CMOS imager and the resultant image decoded for authentication of the BRAND "SOURCE".

It is yet still a further object of this invention to provide a new and novel system which serves to establish communication between the party seeking authentication of the BRAND and the BRAND "SOURCE" for purposes of interest to both and for marketing the same and other products and/or services of the BRAND "SOURCE"; and otherwise to provide to the BRAND "SOURCE" information pertinent to the whereabouts and product and other interests, and demographic data pertinent to the party making the inquiry.

It is yet still an even further object of this invention to provide a new and novel unique identifier wherein both direct part marked encoded symbology and an otherwise encoded chip are combined for BRAND "SOURCE" authentication and for other ID purposes if desired.

These and other objects of the present invention are achieved in the preferred embodiments disclosed below by providing BRAND "SOURCE" unique identifiers for authenticating at least the BRAND "SOURCE"

BRIEF DESCRIPTION OF THE DRAWINGS

Some of the objects of the invention have been set forth above. Other objects and advantages of the invention will appear as the description proceeds when taken in conjunction with the following drawings, in which:

FIG. 9 is a schematic perspective showing of an alternative embodiment of unique identifier. Incorporating the instant invention, that has the encoded symbology direct part marked on its surface and fabricated for insertion into a metal casing, such as a watch case, so that the symbology may be read and decoded;

FIG. 10 is a plan view of an article of jewelry with the authenticator BRAND and encoded symbology direct part marked into the material of the jewelry;

FIG. 11 is a side view of the article of jewelry of FIG. 10 with the authenticator BRAND and encoded symbology direct part marked into the material of the jewelry;

FIG. 12 is a schematic section through the symbology of the instant invention as shown, for example, in FIGS. 2 & 3;

FIG. 13 is a schematic section through another portion of the symbology of the instant invention as shown, for example, in FIGS. 2 & 3;

FIG. 14 is a schematic of a brick and mortar type installation of a business entity, displaying a BRAND "SOURCE" unique identifier for imaging, wireless transmission and wireless return authentication or other advice;

FIG. 15 is a schematic example of a BRAND "SOURCE" unique identifier that might be utilized for the business entity of FIG. 14;

FIG. 16 is a schematic example of an alternative BRAND "SOURCE" unique identifier that might be utilized for the business entity of FIG. 14;

FIG. 17 is a schematic showing of a monitor for a PC, Lap Top or other Computer equipped to provide BRAND-"SOURCE" authentication wherein an imager, Camera, or the like is not available;

FIG. 21 is a block diagram of alternate communication links between the web portals and data banks of the authentication system of FIGS. 19 and 20;

FIG. 22 is a block diagram of other alternative communication links between the web portals and data banks of the authentication system of FIGS. 19 and 20;

DESCRIPTION OF THE INVENTIVE EMBODIMENTS

Figure 1:
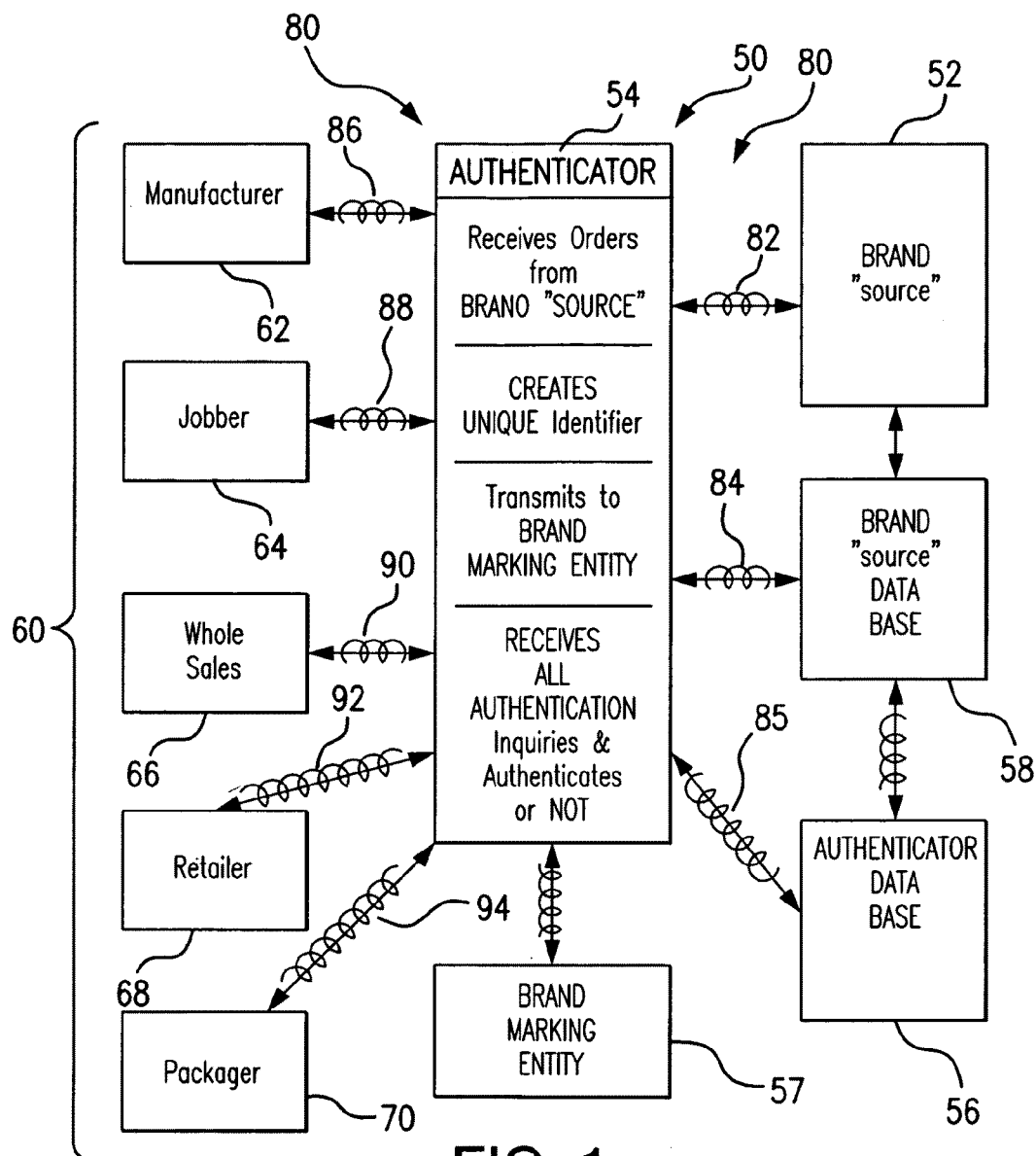
FIG. 1 is a schematic block diagram a new and novel Brand "SOURCE" authentication system, incorporating the instant invention.

With reference to FIG. 1 there is generally shown a schematic block diagram for a BRAND "SOURCE" authentication system 50, including: a BRAND "SOURCE" 52; an authenticator 54; a BRAND "SOURCE" Data Base 56; a BRAND MARKER 57; an authenticator Data Base 58; and a group of interested entities 60. The group of entities 60 includes entities, parties, persons, and the like, that may be, or are in fact, concerned with knowledge that the BRAND on an article, or articles, that they are involved with is, in fact, the BRAND of the BRAND "SOURCE" intended for the article(s). Group 60 is illustrated as including parties involved with the production and sale of the respective article(s) such as: a manufacturer 62, jobber 64, wholesaler 66, and/or retailer 68 for those article(s) and especially a prospective or actual purchaser 70 of the article(s). Other involved parties, such as auditors, customs officials, tax collectors, etc. and the like, may also be interested in authenticating the BRAND "SOURCE" of such article(s). Bi-directional communication links 80, such as links 82, 84 86, 88, 90, 92, 94, and 96, interconnect the various components of system 50. Such communication links may include wired lines, wireless and internet connections, and the like; and most especially camera equipped cell phones, camera equipped smart phones and other camera equipped mobile devices. All such devices should be equipped with, or be otherwise supported by, conventionally available software and a VPN preferably provided by authenticator 54 (Authenticator Virtual Private Network-AVPN). All of the afore described components are to be interrelated so that when a camera is enabled to image a unique BRAND "SOURCE" identifier 110 (FIGS. 2 and 3), associated with the respective article(s) and/or service(s), it may transmit the identifier image to a designated party as will be described, or it may decode a uniquely encoded symbology 112, of unique identifier 110, and transmit the resulting decode to a designated party as will be described in greater detail hereinafter.

Figure 2:
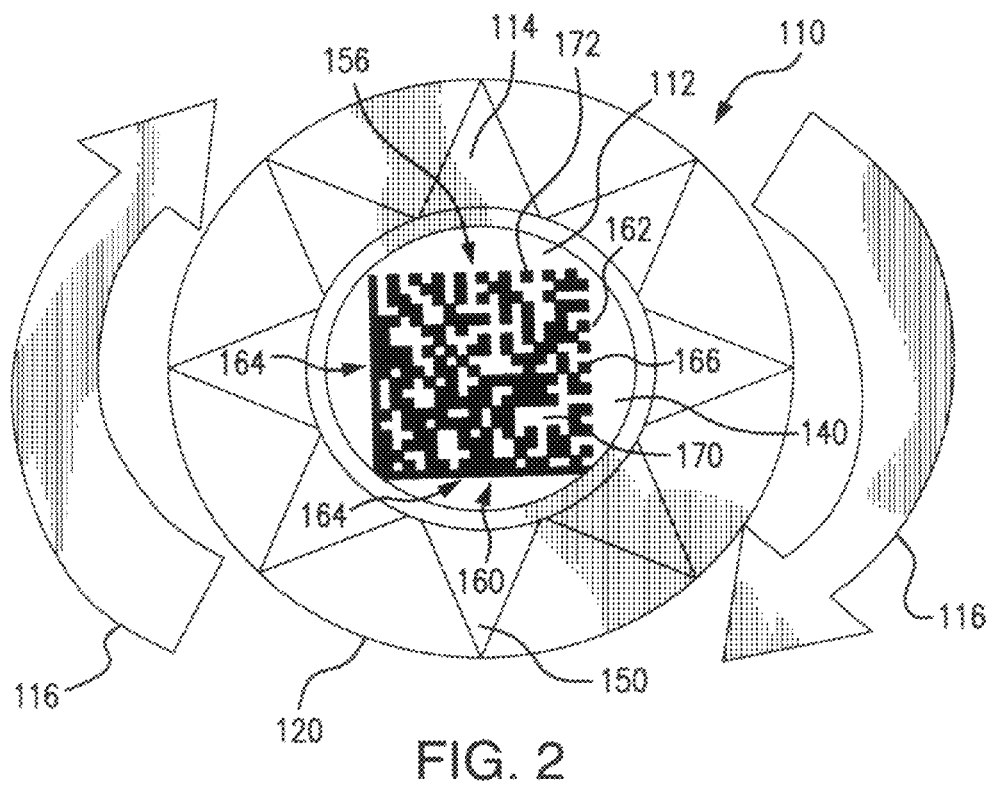
FIG. 2 is a plan view of a new and novel BRAND "SOURCE" unique identifier, incorporating the instant invention, significantly enlarged to better show and describe the portions and components thereof.
Figure 3:
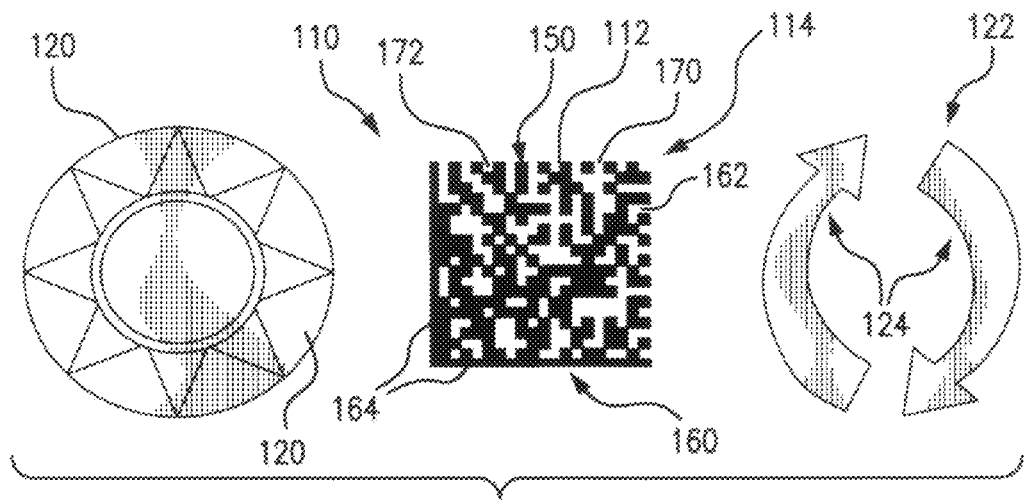
FIG. 3 is a plan view of an alternative embodiment of a new and novel BRAND "SOURCE" unique identifier, with its components separated, incorporating the instant invention.

With particular reference to FIGS. 2 & 3 there is generally shown unique BRAND "SOURCE" identifier 110 (further also referred to as IDENTIFIER 110) which includes, but is not necessarily limited to, at least two, but possibly three or more, display portions. A first display portion 114 comprises a unique encoded symbology display portion for displaying encoded symbology 112 pertaining to the article(s) and/or service to be authenticated. A second display portion 116 comprises an authenticator BRAND display portion for displaying a BRAND 120 of authenticator 54 that signifies that the BRAND "SOURCE" of the article(s) and/or service is authenticateable, A third display portion 122 comprises a BRAND "SOURCE" BRAND display portion and may be optionally utilized when and if so desired by BRAND "SOURCE" 52 to display the BRAND 124 to be authenticated. BRAND 120 of authenticator 54 and BRAND "SOURCE" BRAND 124 of BRAND "SOURCE" 52 to be authenticated and which are to be carried and displayed or otherwise associated with IDENTIFIER 110 display portions 116 and 122 respectively are so carried and displayed uncoded and user visually recognizable; while unique encoded symbology 112, is allocated to display portion 114 to carried by and displayed and/or otherwise associated with IDENTIFIER 110 so as to be imaged, decoded and utilized to authenticate the BRAND "SOURCE". It should be understood that while the two or possibly three portions of IDENTIFIER 110 are preferably arranged as shown in FIG. 2 that such portions can be otherwise arranged; such as by being horizontally adjacent as shown in FIG. 3; vertically arranged (not shown) or arranged in as many dispositions as BRAND "SOURCE" 52 and authenticator 54 agree upon or as possibly required for the article(s) and/or service(s) to be authenticated. In addition that while encoded symbology 112 has been shown surrounded by, or imbedded within BRAND 120 of authenticator 54 it may be otherwise displayed. It should be further understood that while a Data Matrix type symbology has been shown and described as the preferred encoded symbology that other encoded symbologies may be utilized as long as such other symbologies are uniquely generated under criteria as that shown and explained for encoded symbology 112. Such encoded symbologies may furthermore be not only encoded but they may just as well be encrypted, or just encrypted.

Figure 4:
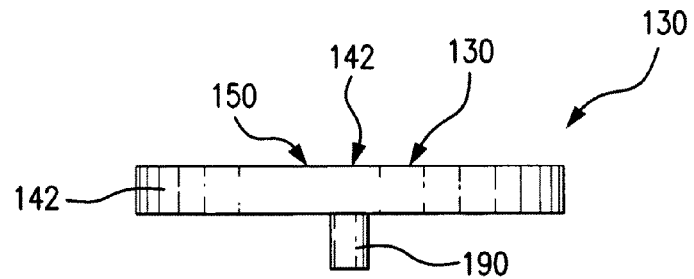
FIG. 4 is a side view of the Brand "source" unique identifier of FIG. 2.
Figure 5:
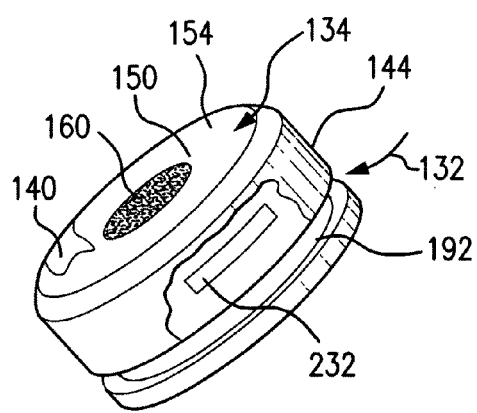
FIG. 5 is a schematic of an alternative embodiment of unique identifier incorporating the instant invention and cut away in part to better show an RFID chip which also includes encoded symbology.

Unique BRAND "SOURCE" identifier 110 (FIGS. 2 & 3) is to be provided by authenticator 54 (FIG. 1), as will be hereinafter described in greater detail, and can be so provided in any convenient manner as agreed upon by BRAND "SOURCE" 52 and authenticator 54, such as: authentication tags 130 (FIG. 4); authentication buttons 132 (FIG. 5); electronic and/or other types of listings and/or by any other media. Encoded symbology 112 is preferably applied to the respective tag(s) 130 and buttons 132 by, or under control of, authenticator 54 and may be so applied by direct part marking of tag(s) 130 and buttons 132; or by affixing labels 134 to such tags 130 and buttons 132. Direct part marking of tags 130 and labels 132 may be accomplished, by and/or under control of authenticator 54, by dot peening encoded symbology 112 onto tags 130 and/or buttons 132; or by other methods of direct part marking, as by laser etching or the like. For example, symbology 112 is shown as applied by direct part marking for articles, such as article 136 (FIG. 9) and/or article 138 (FIGS.10 and 11); and by being applied to label(s) 134 which are thereafter affixed to such tags 130 and buttons 132 as shown for a label 134 that has been affixed to a surface 140 of button 132 (FIG. 5). Such symbologies may also be encrypted.

Identifier tags 130 (FIGS. 4) and buttons 132 (FIG. 5) may be fabricated from identifier blanks 142 (FIGS. 4) and 144 (FIG. 5), respectively, of predetermined configuration, size and thickness. They are shown, for example, as fabricated from circular and cylinder-like blanks but may just as well be fabricated from a blank or blanks of any convenient configuration such as square, triangular, oval, hexagon, octagonal, or the like, depending on the information to be carried by IDENTIFIER 110 and the aesthetics and other criteria of authentication system 50, BRAND "SOURCE" 52 and authenticator 54. Identifier blanks 142, 144 are preferably fabricated from good quality steel or other metal, or combinations or compounds of metal, and so as to provide a data field 150 FIGS. 2, 4 & 5) on a surface 152 (FIGS. 4 & 5) that will accept encoded symbology 112 whether applied thereon as by a label 134 affixed thereto or by direct part markings as described above. Ceramics, glass, plastics and other materials, natural and/or synthetic, suitable to accept direct part markings and/or labels carrying encoded symbology 112, may just as well be utilized for identifier blanks 142, 144. While IDENTIFIER 110 is shown and described, for example, with direct part markings it may just as well have its encoded symbology 112 applied onto a substrate such as label 134 and the substrate affixed to a surface of IDENTIFIER 110.

The instant invention also contemplates application of uniquely encoded symbology 112 directly upon the article(s), and/or literature concerning services, by methods such as printing, direct marking, embroidery, and the like. In addition said uniquely encoded symbology may be, or also be, encrypted.

Encoded symbology 112 is preferably of the 2-D, Data Matrix type. However, encoded symbology 112 incorporating the instant invention is specially and uniquely formatted. Some characteristics of unique encoded symbology 112 are the same as for a conventional Data Matrix symbology; but the unique encoding of symbology 112 facilitates relatively rapid and error free coding, decoding and transmission and use thereof in BRAND "SOURCE" authentication, as will be described below. As an alternative symbology for IDENTIFIER 110 conventional Data Matrix encoding may be utilized.

As in conventional Data Matrix type symbology and the matrix code format, black data elements (cells) usually represent a binary "1" and white data elements (cells) usually represent a binary "0"; but the opposite is also possible. When these binary values are used together in specific sequences, they represent alphanumeric characters. The basic elements of an encoded matrix symbol 160 (FIGS. 2 & 3), although shown, for example, as a square, may also be rectangular, circular or of other configurations, and usually include a data storage field 162 disposed between solid borders 164 and broken borders 166, or borders of other configurations to facilitate location and decoding of the encoded data. White data cells 170 and black data cells 172 are usually arranged within data storage field 162, through known conventional methods, to provide encoded data, information and the like. In fact conventional Data Matrix symbols have been placed in the public domain and have been recommended by the American National Standards Institute (ANSI) for use in direct part marking. Alternatively encoded Data Matrix symbols are applied to a carrier strip, such as a pressure sensitive label, which could then be applied to an item. Data Matrix symbols may also be applied by direct part marking.

It should be noted that to better explain the instant invention for symbology 112 the binary 1 data cells are illustrated in black and the binary 0 data cells are illustrated as white, but in actuality for direct part marking such cells will appear to the naked eye as being of the same color, the color of IDENTIFIER blank 140 or of the part to be direct part marked with IDENTIFIER 110, unless somehow otherwise colored. However, when such encoded symbology 112 is to be imaged, as by an imager (such as the camera of a cell phone, smart phone, or the like), as will be hereinafter explained, such cells will appear to an imager/reader/camera as being of different reflectivity. FIGS. 12 and 13, by way of example, illustrate a portion 180 of a direct part encoded symbology, such as symbology 112, with recessed areas 182 separated by adjacent part material surfaces 184 of the symbology at the level of the surface 186 of IMAGER blank 140. It may be necessary to provide a source of illumination 188 (such as the illumination from a camera equipped: imager, cell phone, smart phone, or the like) to be projected towards symbology 112 at an angle and so that the reflections from recesses 182 and surfaces 184 present sufficiently different contrasts upon the imager to provide an accurate differential there between and an accurate decoding of encoded symbology 112. Tilting the article(s) in ambient light may also facilitate providing the best image possible to the imager.

Unique and uniquely encoded symbology 112 includes three data sub-fields not delineated in the drawings) distributed throughout data field 162. A first data sub-field is allocated as a BRAND "SOURCE" Enterprise Identifier and preferably includes six (6) alphanumeric characters. A second data sub-field is preferably allocated to a Julian Date and includes five (5) numeric characters. A third data sub-field is for an article identifier and preferably includes eight (8) alphanumeric characters. While the preferable allocation if for 19 characters allocated as described above; it should be understood that more or even less characters may be utilized and otherwise allocated to data fields and/or sub data fields.

The BRAND "SOURCE" Enterprise Identifier is assigned to BRAND "SOURCE" 52 (FIG. 1) by authenticator 54. The Julian Date is the date of manufacture by authenticator 54, or their authorized entity, of IDENTIFIER 110 whether IDENTIFIER 110 is in the form of tags 130, or buttons 132, direct part marked or with applied labels 134, or a listing for the purpose of placing IDENTIFIER 110 directly on the article(s) as described herein above. The article Identifier is assigned by authenticator 54, or their authorized entity, as the tags 130, buttons 132 or other article marking is effected and can be in serial order or random. Each such article identifier is to have its encoded symbology different from the encoded symbology of all other article identifiers; even though created on the same Julian Date and for the same BRAND "SOURCE". No two article identifiers will be the same. The inventive uniqueness of BRAND "SOURCE" identifier 110 is thus accomplished by combining the three (3) sub-data fields as described hereinabove, into one nineteen (19) character string, more or less.

It should be understood that while the preferred embodiment of unique IDENTIFIER encoded symbology is to be generated by a nineteen character string allocated as described herein above that other similar multi character, reduced or enlarged in number, and simplified character strings are encompassed by this new and novel invention; and that other sub-field sized character allocations are similarly encompassed by this new and novel generation of an encoded symbology.

Figure 6:
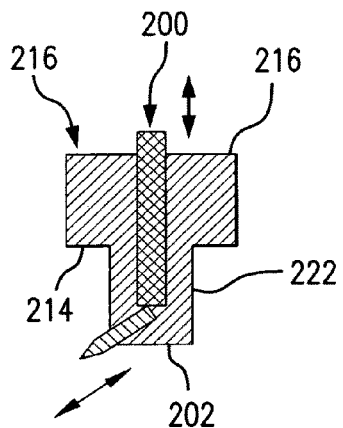
FIG. 6 is a sketch of a cutting tool for use with the unique identifier of FIG. 5 to facilitate attaching same to an article to have its Brand "SOURCE" authenticated.
Figure 7:
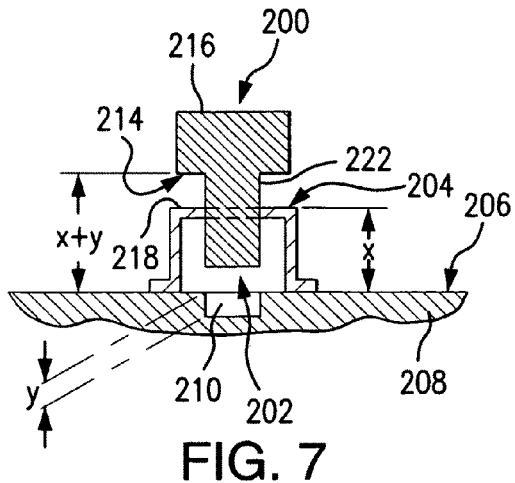
FIG. 7 is a sketch of the cutting tool of FIG. 6 utilized with a depth gauge to form a seat in an article to receive the unique identifier of FIG. 5, to have its Brand "SOURCE" authenticated.
Figure 8:
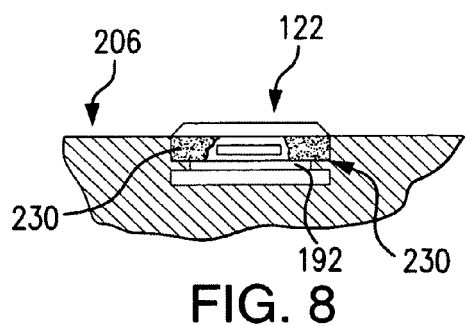
FIG. 8 is a sketch of the unique identifier of FIG. 5 seated and attached to an article that is to have its Brand "SOURCE" authenticated and which is cut away in part to better show the imbedded RFID chip.

A shank 190 (FIG. 4) may be fabricated to extend down from blank 142 of identifier 130 to facilitate attachment of IDENTIFIER 110 to the article(s), the BRAND "SOURCE" of which is to be authenticated. In an alternative embodiment blank 144 of identifier button 132 (FIG. 5) is formed with a circumferential groove 192 that extends around blank 144 to facilitate its installation on an article. To effect such installation first a tool 200 (FIGS. 6 and 7) with a cutting edge 202 is positioned within a tool guide 204 (FIG. 7) positioned on a surface 206 of an article 208 the Brand "source" of which is to be authenticated. Article 208 may be a watch, a piece of jewelry, a handbag, brief case, or the like. Cutting tool 202, when positioned within tool guide 204 and utilized, will form a recess 210 in surface 206. The height of a shank portion 222 of tool 200 is selected to equal the depth "y" of recess 210 plus the height "x" of tool guide 204 so that when an undersurface 214 of a cap portion 216 of tool 200 touches an upper surface 218 of tool guide 204 recess 210 will be formed to its selected depth "y". An appropriate adhesive 230 (FIG. 8) is disposed within recess 210 sufficient to fill groove 192 of identifier button 132 and any portion of recess 210 not occupied by identifier button 132. Authentication tags 130 and authentication buttons may be otherwise carried by and/or secured to articles, and/or their packaging by other suitable and appropriate methods such as strings, wrappings or the like.

An RFID chip 232 (FIG. 5), of a conventionally type and availability, may be installed into button 132 as shown in FIG. 5. By including RFID chips 232 in identifier button 132 tracking the movement of batched articles is greatly facilitated and enhanced. However such RFID chips are typically not used for authentication of BRAND "SOURCE". RFID chips provide a complementary technology and RFID can be used to track BRAND "SOURCE" authenticated articles along the supply chain. An RFID chip would be able to identify identifiers contained within a container through appropriate database functions. A suitable database, software equipped and otherwise designed, may be provided to accommodate logging article tracking along the supply chain from manufacturing site to distribution center. However, BRAND "SOURCE" authentication for such articles requires scanning of the actual IDENTIFIER 110 carried by or otherwise associated with an article or articles, rather than being inferred from an RFID database entry.

When a BRAND "SOURCE", such as BRAND "SOURCE" 52 (FIG. 1), intends to have the particular BRAND on their BRANDED articles prepared for BRAND "SOURCE" authentication they, or a party authorized by the BRAND "SOURCE" to do so, contact Authenticator 54, possibly by secure transmission and encrypted, and request Authenticator 54 to prepare and otherwise issue unique, authenticateable, identifiers 110 pertinent to the BRAND "SOURCE" 52 and the article(s) to be BRANDED, as described hereinabove. Authenticator 54, following instructions from, recommendations to and agreement with, BRAND "SOURCE" 52 will have a set of unique identifiers 110 prepared and provided to BRAND MARKING ENTITY 56. Identifiers 110, so prepared, will include at least the unique encoded symbology 112 pertinent to the BRAND "SOURCE" of the BRAND to be applied, and a visually recognizable BRAND of Authenticator 54 and may, or may not, include other encoded data provided by BRAND "SOURCE" 52. Such identifiers 110 may also include a visually recognizable showing of the BRAND that is to be authenticated. Such unique identifiers 110 may be tags 130, and/or buttons 134, with special Data Matrix-type encoded symbology 112, prepared as described hereinabove and already applied to the tag(s) 130 or button(s) 132; or a listing of such Data Matrix type encoded symbology 112 for application of the Data Matrix-type uniquely encoded symbology 112 to be otherwise applied on or with the respective article(s).

The unique encoded symbology so provided is stored by, or for, authenticator 54 in the Authenticator Data Base 58 at the time such unique identifiers 110 are so prepared. The veracity and secrecy of the encoded identifier data 112 is significantly enhanced and protected if authenticator 54 is preferably an independent third party and the data once stored: cannot be erased or modified but only indicated as not used; and can only be accessed by, or under control of, authenticator 54 for BRAND "SOURCE" authentication purposes, as will be explained in greater detail hereinafter. It is possible, however, for BRAND "SOURCE" 52 to either be able to store BRAND "SOURCE" and other data in its own data storage facility(s) and or to control access thereto to store such data and/or to access such data for authentication purposes.

Persons and/or business entities (inquirers), interested in acquiring a BRANDED article, or availing themselves of a BRANDED service, upon seeing IDENTIFIER 110 with BRAND 120 of authenticator 54 will recognize that the BRAND "SOURCE" of such article(s) or service is authenticatable. All that needs to be done is to image the unique encoded symbology 112, carried by IDENTIFIER 110, and transmit the image and/or its decode, to administrator 54 for authentication of the BRAND "SOURCE" of the article. The imager to be so utilized needs to be camera equipped and otherwise equipped to image and decode 2D Data Matrix type encoded, and/or possibly encrypted, symbology and to transmit the image and/or encoded symbology and possibly a decode of the encoded symbology to authenticator 54 by an available Authenticator Virtual Private Network (AVPN) previously supplied for the imager by authenticator 54. Authenticator 54, upon receipt of the image, and/or decode, of the encoded symbology 112 carried by the article or service, can then query authenticator data base 58 (FIG. 1) and match, from data previously stored in data base 58, if there is stored data corresponding to the so received decode of the specific encoded symbology carried by the article or service. Authenticator 54 furthermore transmits the decode of the encoded symbology to BRAND "SOURCE" 52 for comparison with data stored in the BRAND "SOURCE" data storage facility 56. If there is a match of the decode then BRAND "SOURCE" 52 so advises authenticator 54 and authenticator 54 transmits an authentication of the BRAND "SOURCE" back to the person or business entity that transmitted the inquiry. If there is no match BRAND "SOURCE" 52 so advises authenticator 54 and authenticator 54 either advises those parties that there is no match and/or that the article is counterfeit. It should be noted that according to this invention all inquiries concerning authentication of BRAND "SOURCE" must be routed to authenticator 54.

If authenticator 54 has made a determination that an article or articles and/or service or services is counterfeit that information may be transmitted to BRAND "SOURCE" 52 according to protocols agreed upon between authenticator 54 and BRAND "SOURCE" 52. There could be at least claims of violating unfair competition laws by passing-off of the article as one made by the BRAND "SOURCE" 52 and possibly copyright infringement; as well as trademark infringement of the BRAND of authenticator 54, and, if utilized, trademark infringement of the trademark(s) of BRAND "SOURCE" 52.

It is also possible that authenticator 54, and/or BRAND "SOURCE" 52, upon receipt of the image and/or decode, can determine from the serial number that the specific article is, in fact authentic, BUT that the specific article had been diverted and/or stolen. Exactly how that information is utilized will depend upon agreement(s) between BRAND "SOURCE" 52 and authenticator 54.

In addition to the above, agreement by a party having access to the authenticator's VPN may be worded to permit the BRAND "SOURCE" and/or authenticator to establish a line of communication with the party contacting the authenticator for marketing purposes and so that the BRAND "SOURCE" can obtain location, demographic, and other information pertinent to the inquiring party.

Persons and/or business entities (inquirers) have many interests in mind when they shop or require service for articles and or services they may already have. Quite often they know what kind and BRAND of article they are shopping for or what type of service they need to obtain for a particular article. It is also possible that the shopper may even know where there is a brick and mortar establishment where they can make the intended purchase or obtain the required service. FIGS. 14, 15 and 16 show new and novel embodiments of this invention to such matters.

With respect to the new and novel embodiment of FIGS. 14 & 15 there is shown a brick and mortar establishment (store) 240 that indicates, on its store front at 242 (FIG. 14) that it is an authorized dealer for certain named articles (products) and/or an authorized service location for certain named articles (products). However the prospective purchaser, or party 244 requiring service, is a knowledgeable party and knows better than to trust such store front proclamations 242. Party 244 notices that a BRAND "SOURCE" identifier 250 (FIGS. 14 & 15), such as IDENTIFIER 110 hereinabove described, is observable on or in proximity to a window or face panel 252 of store 240.

BRAND "SOURCE" identifier 250 (further also referred to as IDENTIFIER 250), similar to IDENTIFIER 110 as described hereinabove, also includes, but is not necessarily limited to, at least two, but possibly three or more, display portions. A first display portion 254 comprises a unique encoded symbology display portion for displaying encoded symbology 256 pertaining to the authenticity of that particular location as being a BRAND "SOURCE" AUTHORIZED location to purchase and/or have serviced: specific BRAND "SOURCE" BRANDED article(s) and/or services; specified categories of BRAND "SOURCE" BRANDED articles and/or service or all BRAND "SOURCE" BRANDED articles and/or service. A second display portion 258 comprises an authenticator BRAND display portion for displaying BRAND 120 of authenticator 54 to signify that authentication as to whether or not the party alluding to being AUTHORIZED by a BRAND "SOURCE" is, or is not, so AUTHORIZED. A third display portion 260 comprises a BRAND "SOURCE" BRAND display portion and may be optionally utilized when and if so desired by BRAND "SOURCE" 52 to display a house BRAND, similar to BRAND 124 (FIGS. 2, 3 & 15), but not necessarily the same as BRAND 124. BRAND 120 of authenticator 54 and BRAND "SOURCE" BRAND 124 of BRAND "SOURCE" 52 are displayed unencoded and user visually recognizable; while unique encoded symbology 256, is allocated to display portion 254 to be carried by and displayed and/or otherwise associated with IDENTIFIER 250 so as to be imaged, decoded and utilized to authenticate the BRAND "SOURCE" authorization of the location and/or entity responsible for the location.

It should be understood that while the two or possibly three portions of IDENTIFIER 250 are preferably arranged as shown in FIG. 15 that such portions can be otherwise arranged; such as by being horizontally adjacent as shown in FIG. 3; vertically arranged (not shown) or arranged in as many dispositions as BRAND "SOURCE" 52 and authenticator 54 agree upon or as possibly required for the article(s) and/or service(s) to be authenticated. In addition that while encoded symbology 256 has been shown surrounded by, or imbedded within BRAND 120 of authenticator 54 it may be otherwise displayed. It should be further understood that while a Data Matrix type symbology has been shown and described as the preferred encoded symbology that other encoded and/or encrypted symbologies may be utilized as long as such other symbologies are uniquely generated under criteria as that shown and explained for encoded symbology 112 (FIG. 2).

Unique BRAND "SOURCE" identifier 250 (FIGS. 14 & 15) is to be provided by authenticator 54 (FIG. 1), as will be hereinafter described in greater detail, and can be so provided in any convenient manner as agreed upon by BRAND "SOURCE" 52 and authenticator 54, such as: a decal that can be affixed to a window; a placard that may be displayed in a window or otherwise on the premises; and/or any other convenient manner as a display to the public that the locations authorization by a particular BRAND "SOURCE" is authenticatable. Encoded symbology 256 is preferably applied to the respective display, by, or under control of, authenticator 54 and may be so applied by any convenient and available method.

Encoded symbology 256, like encoded symbology 112 (FIGS. 2 & 3), is preferably of the 2-D, Data Matrix type. However, encoded symbology 256 incorporating the instant invention is specially and uniquely formatted. Some characteristics of unique encoded symbology 256 are the same as for a conventional Data Matrix symbology; but the unique encoding of symbology 256 facilitates relatively rapid and error free coding, decoding and transmission and use thereof in BRAND "SOURCE" authentication, as will be described below. As an alternative symbology for IDENTIFIER 250 conventional Data Matrix, or other 2d type or bar code encoded and/or encrypted symbologies may be utilized.

Unique and uniquely encoded symbology 256, similar to symbology 112 (FIGS. 2 & 3) will include a number of data fields, possibly three, (not delineated in FIG. 15). distributed throughout a data field 262. A first data sub-field is allocated as a BRAND "SOURCE" Enterprise Identifier and includes six (6) alphanumeric characters. A second data sub-field is allocated to a Julian Date and includes five (5) numeric characters. A third data sub-field is for location and type of location (article dealer, article service, service availability, etc.) and may include a selected number of alphanumeric characters, preferably eight (8).

The BRAND "SOURCE" Enterprise Identifier is assigned to BRAND "SOURCE" 52 (FIG. 1) by authenticator 54. The Julian Date is the date of fabrication of IDENTIFIER 250 by authenticator 54, or their authorized entity. The type of business and location Identifier is assigned by authenticator 54, or their authorized entity, as when IDENTIFIER 250 is fabricated and can be in serial order or random. Each such location identifier is to be different from all other location identifiers; even though created on the same Julian Date and for the same BRAND "SOURCE". No two location identifiers will be the same. The inventive uniqueness of BRAND "SOURCE" identifier 250 is thus accomplished by combining the three (3) sub-data fields as described hereinabove, into one nineteen (19) character string.

IDENTIFIERS 250 are fabricated by authenticator, or under authority of authenticator, upon request of BRAND "SOURCE" 52 and after being so fabricated are dispatched to BRAND "SOURCE" 52 or their designee. At the time of fabrication or when so dispatched authenticator 52 is to store symbology 256 in authenticator's data storage facility, such as Data Base 58 (FIG. 1).

It should be understood that while the preferred embodiment of unique IDENTIFIER encoded symbology is to be generated by a nineteen character string allocated as described herein above that other similar reduced, enlarged, and/or otherwise simplified character strings are encompassed by this new and novel invention; and that other sub-field sized character allocations are similarly encompassed by this new and novel generation of an encoded symbology. Encoding may also use other alphanumeric, numeric or alpha characters and need not necessarily include a Julian Date Persons and/or business entities (inquirers) such as the symbol shown at 244 (FIG. 14), interested in locating an AUTHORIZED dealer/service location for a particular BRAND upon seeing IDENTIFIER 250 with BRAND 120 of authenticator 54 will recognize that the BRAND "SOURCE" of the alluded to AUTHORIZATION is authenticatable. All that needs to be done is to image the unique encoded symbology 256, carried by IDENTIFIER 250, and transmit the image, or its decode, to authenticator 54 for authentication. The imager to be so utilized needs to be camera equipped to image and decode 2D Data Matrix type encoded symbology and to transmit the decode to authenticator 54 by an available Virtual Private Network (VPN) previously supplied for the imager by authenticator 54. Authenticator 54, upon receipt of the decode of the encoded symbology 256, can then query authenticator data base 58 (FIG. 1) and match, from data previously stored in data base 58, if there is stored data corresponding to the so received decode of the specific encoded symbology carried by IDENTIFIER 256. Authenticator 54 also transmits the decode to BRAND "SOURCE " 52 for BRAND "SOURCE" 52 to determine if there is, or is not, a match to stored IDENTIFIER symbology in their data base. If there is a match of the decode then BRAND "SOURCE" 52 confirms that to authenticator 54 and authenticator 54 transmits an authentication of the BRAND "SOURCE" authorization back to the person or business entity that transmitted the inquiry. If there is no match authenticator 54 either advises those parties that there is no match and/or that authorization is not as alluded to. It should be noted that according to this invention all inquiries concerning authentication of BRAND "SOURCE" must be routed to authenticator 54.

Party 244 (FIG. 14) images IDENTIFIER 250, including its symbology 256 with a mobile device 270 which may be the camera of camera equipped cell phone, smart phone or other similar device equipped with an imager, decoder and decode transmission capability. The decode is then preferably transmitted by wireless transmission 272, the internet 274 and further wireless transmission 276 to authenticator 54. Authenticator 54 will, in turn, search their Data Base 58 for a match of the so transmitted symbology 256 with the symbology stored in data base 58. Authenticator 54 will thereafter, and in real time, advise inquiring party 244 of the results of the search by wireless transmission 278, internet 274, further wireless transmission 280, and mobile device 270. and thereby to inquiring party 244.

If authenticator 54 has made a determination that there is no match in Data Base 58 between encoded symbology 256 of the imaged IDENTIFIER 250 then authenticator 54 will advise inquiring party 244 according to what BRAND "SOURCE" 52 and authenticator 54 agreed to for such an incidence. If there is a "no match" situation authenticator 54 may also advise BRAND "SOURCE" 52 of that according to protocols agreed upon between authenticator 54 and BRAND "SOURCE" 52. There could be at least claims of violating unfair competition laws and possibly copyright infringement; as well as trademark infringement of the BRAND of authenticator 54, and, if utilized, trademark infringement of the trademark(s) of BRAND "SOURCE" 52.

In addition to the above, agreement by a party having access to the authenticator's VPN may be worded to permit the BRAND "SOURCE" and/or authenticator to establish a line of communication with the party contacting the authenticator for marketing purposes and so that the BRAND "SOURCE" can obtain location, demographic, and other information pertinent to the inquiring party.

Instructions 284 (FIG. 15) on how to authenticate the alluded to AUTHORIZATION may also be presented on IDENTIFIER 250; while a similar set of instructions 286 are presented on an alternative embodiment of the instant invention utilizing an IDENTIFIER 290 (FIG. 16). Identifier 290 is also to be utilized to authenticate BRAND "SOURCE" AUTHORIZATION but for a number of BRAND "SOURCE" BRANDS 292.

An IDENTIFIER, similar to IDENTIFIERS 250 & 290, may also be utilized on BRAND "SOURCE" marketing and/or informational literature such as: brochures; advertising; and web sites of the BRAND "SOURCE". By doing so a party will be able to utilize their mobile device (camera, camera equipped smartphone and/or cell phone or the like), provided with decoding and VPN capabilities as described above, to contact authenticator 54 and authenticate that the information is by and of the BRAND "SOURCE" 52. Wireless, land lines, internet and/or other available methods and equipment may be employed to facilitate such communications.

There may be situations where a party does not have an imager equipped to decode 2D Data Matrix encoded symbology; but the party may still be interested in authentication of BRAND "SOURCE" BRANDED articles and services, and/or BRAND "SOURCE" authorized sales and service locations. Another alternative embodiment incorporating the instant invention is shown in FIG. 17 wherein there is shown a monitor 300 for a PC 302, desk top, lap top, cell phone (serving computer function), or the like. Monitor 300, and thereby its PC 302, is equipped with an icon 310 depicting an authenticator BRAND 110 such as authenticator BRAND 120 (FIGS. 2, 3, and 15). Clicking on icon 310 will open an authenticator window 320 within which there are a number of interactive items 322, such as questions, article and service descriptions and locations, as well as whatever other information is needed to assist a party interested in specific BRAND "SOURCE: BRANDED articles and/or services. Clicking on a submit box sends the questions to be responded to with the responses, in real time appearing on monitor 300 at 330.

Figure 18:
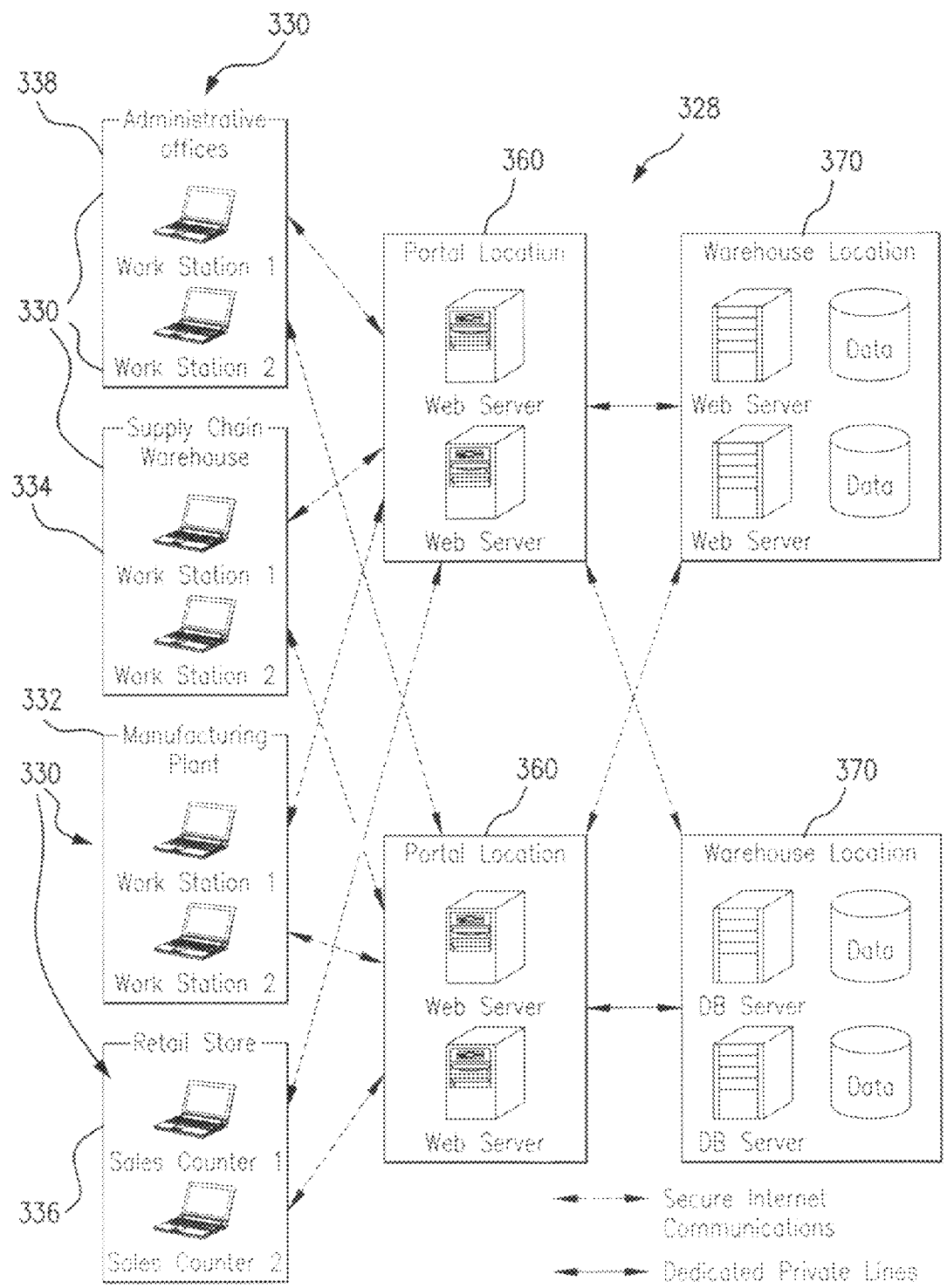
FIG. 18 is a block diagram of a web portal, utilizable with the instant invention, for the authentication system.
Figure 19:
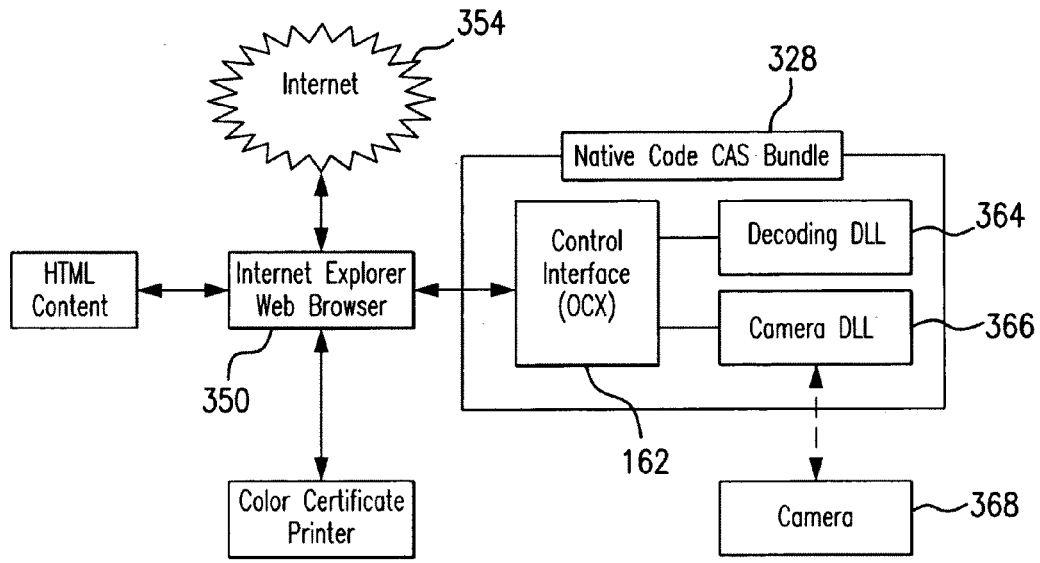
FIG. 19 is a block diagram of an authentication station utilizable with the instant invention.
Figure 20:
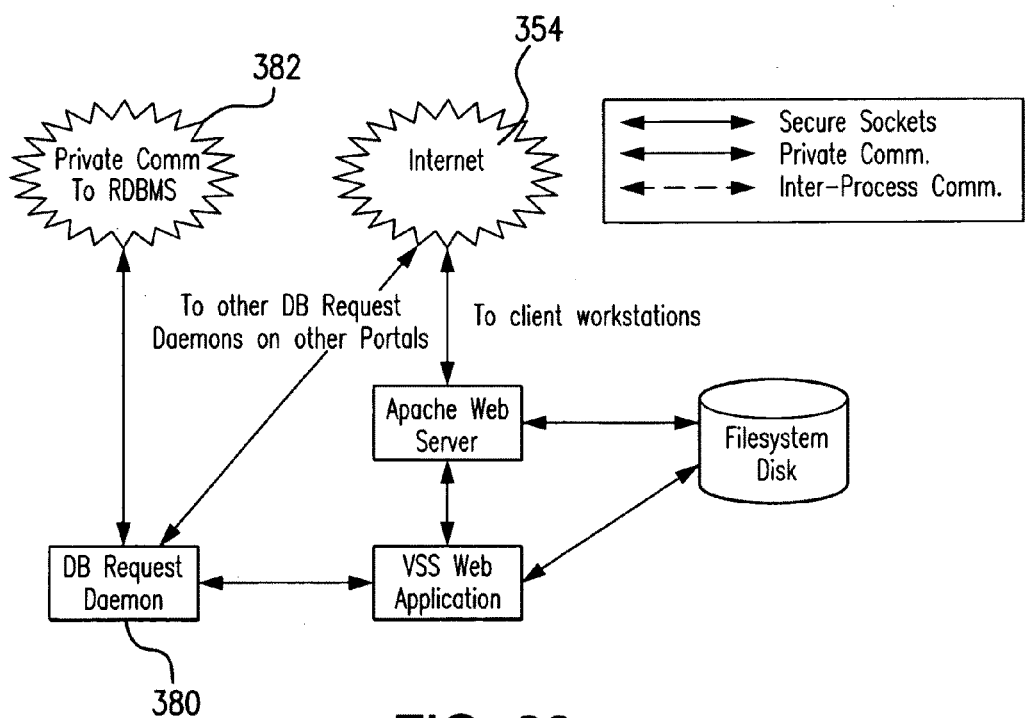
FIG. 20 is a block diagram of an alternate configuration of authentication station utilizable with the instant invention.

Another embodiment of the instant invention is shown in FIGS. 18-22. Authentication workstations 300 (FIG. 18), for respective interested groups, (shown for example as group 60 in FIG. 1 for system 50 and described with respect thereto), are provided at selected facilities and locations which preferably may include locations such as manufacturing plants 332, supply-chain warehouses 334, retail stores 336, and administrative offices 338. Authentication workstations 300 are the user's point of access to authentication system 328 (FIG. 1). Each such workstation 300 (FIG. 18) might include one or more laptop or low-end desktop computers of substantially conventional configuration, running an Internet Explorer web browser 350 (FIG. 19) also of conventional configuration. Converting an existing computer into an authentication workstation 300 requires nothing other than web browser 350 with an appropriate connection 352 to access the available internet 354. Users of authentication system 328 access the software from within a standard web browser running on low-end consumer-grade computers or integrated workstations containing embedded processors. There is no installation footprint for authentication workstations 300 (FIG. 18). The bulk of the software is run on substantially available web portal servers of an authenticator 360 (FIG. 18), similar to authenticator 50 shown and described with respect to FIG. 1, and only a conventionally available small control interface (OCX) 362 (FIG. 19) runs on the workstation 300 to provide control of a camera DLL (Dynamic Link Library) 364 and Data-Matrix decoding DLL 366 for a camera or other imager/reader device 368, such as a cellphone, smart phone etc.

The architecture for authentication workstations 300 (FIG. 18) includes the use of a standard and substantially available web browser such as Internet Explorer 350 to provide reliable authenticated results. However, because the authenticating party must use imager/reader device with its associated sophisticated Data-Matrix decoding software located in the computer standard HTML web content 372 may be insufficient to provide all the features necessary for authentication system 328. A Native code CAB bundle, for example, is a compilation of non-HTML content that will run natively and conventionally at workstations 300.The bundle is downloaded and executed seamlessly by web browser 350. The download occurs once, on the first connection of web-browser 350 to web portal 360. Thereafter, the native bundle remains on an authentication workstation local disks 332-338. The native bundle includes USB camera device DLL 364 and data-matrix decoding DLL 366, along with control interface 362 to expose the functionality to web browser 350. Decoding is done at an authentication workstation 332-338 to maximize bandwidth efficiency. A decoded symbology code is less than 0.1 Kbytes, whereas an un-decoded captured image is roughly 300 Kbytes (a 3000×increase). Because decoding is done at a workstation 332-338, each workstation 300 may need to be licensed to use a decoding software 366. Most likely, a site-license may be purchased from a licensor that will enable all workstations 300 to be licensed for use as authenticating workstations 332-338 Microsoft Internet Explorer conventionally supports control interface 162 to execute the native code. Other popular web browsers include Firefox, Safari (Macintosh), and Opera. Because other web browsers have a different interface for executing native code, an additional native bundle may need to be developed for each web browser that the authentication software must support. In practice, all the web browsers except Internet Explorer use a very similar API (Application Programmer Interface) for execution of native code. Therefore it is likely that one additional implementation of the native code bundle will cover the majority of other popular web browsers.

Authentication workstations 300 in association and communication with web portal servers of authenticator 360 and substantially conventionally available data warehouses 370 FIG. 18) provide a 3-tier architecture for the authentication system 328. Massive scalability is thus available through the described application design through wide-area distribution, that is furthermore flexible enough to allow the system features to evolve over time. The physical locations for data warehouses 370 and portal servers of authenticator 360 need not be distributed across 2 facilities, or even 2 computers; and, as such, they may co-exist in the same computer until the authentication system 328 is large enough to merit their separation.

Each data warehouse 390 may also store chain-of-custody data for authenticated articles in relational databases. A data warehouse 370 might consist of 1 or more Oracle (or other brand) database servers running on high-end server computers. Selected locations for data warehouses 370 might be spread all over the world in strategic locations to mitigate the cost of conventional communication links (not shown) to the nearest web portal. Providing data warehouses 370 as a distinct tier in the architecture of authentication system 328 may also enable other BRAND "SOURCE" parties to store there own selected identification data on server computers maintained at their own private facilities.

The locations for the portals of authenticator 360 serve as Internet connection points for the multitude of authentication workstation 300 computers accessing authentication system 328 through authenticator 360. A web portal might consist of 1 or more conventionally available web servers running on high end server computers. Multiple web portals create redundancy in the system when a facility loses power or Internet connectivity. Also, strategically placing web portals around the world provides faster Internet access to more locations by proximity. As such the web portals constitute key components of the top-level topology of authentication system 328 for the instant invention. Each web portal server runs: a conventionally available web server such as an Apache authentication system web-application and other software. Connectivity is through the Internet (secure sockets, SSL) and through dedicated private communication lines to the locations of data warehouses 372. The web portals perform the business logic of authentication system 328. Dynamic HTML content is generated by the authentication system web application and is served to clients by the web server.

Aiding web application of authentication system 328 is a data base request daemon (DBRD) 380 (FIG. 20), which performs the tasks of actually interfacing with the relational database through a conventionally available relational data base management system (RDBMS) 382 The purpose of database request daemon 380 is to abstract and decouple the database communications from the authentication system web application. Since there will likely be numerous locations for database warehouses 370 and numerous locations for web portals for authenticator 360, it is unlikely that every web portal can have a dedicated connection to every database warehouse 370 through authenticator 360 (due to excessive cost). Therefore, each web portal may be provided with a connection with a subset of the data warehouses 370, through authenticator 360 such as shown in FIGS. 21 and 22, and if a portal requires data from a database 370 with which it has no connection, then data base request deamon 380 can forward the request for data to another web portal whose data base request deamon 380 has a direct connection with the required database 370. This architecture mitigates the need for a private communication lines for every location of and combination of web portal and data warehouse 370 and reduces the required number of dedicated communication lines to data warehouse locations 370 by allowing web portal sites to forward requests to each other Data base request daemon 380 will likely be built using a standardized message service that already provides the complex functionality of synchronously guaranteeing message delivery. Such messaging service APIs (application programmer interface) may include JMS and MSMQ.

Authentication workstations 300 of BRAND "SOURCE"" authentication system 328 are used as routers to send validation queries to the appropriate database 370 for validation. Databases 370 can reside either at a BRAND "SOURCE" site or at an authentication system server location. The authentication system is used to authenticate articles (products, goods) from multiple companies and having a single authentication workstation 130 at a Point Of Sale location reduces the system cost. While the authentication system has the capability to log identifier queries and accumulate statistics for sales purposes, this feature is an optional service and is only activated upon Brand 'source" request. The authentication system Code of Ethics includes that no Brand "source" data will be monitored without Brand "source" written approval.

Figure 23:
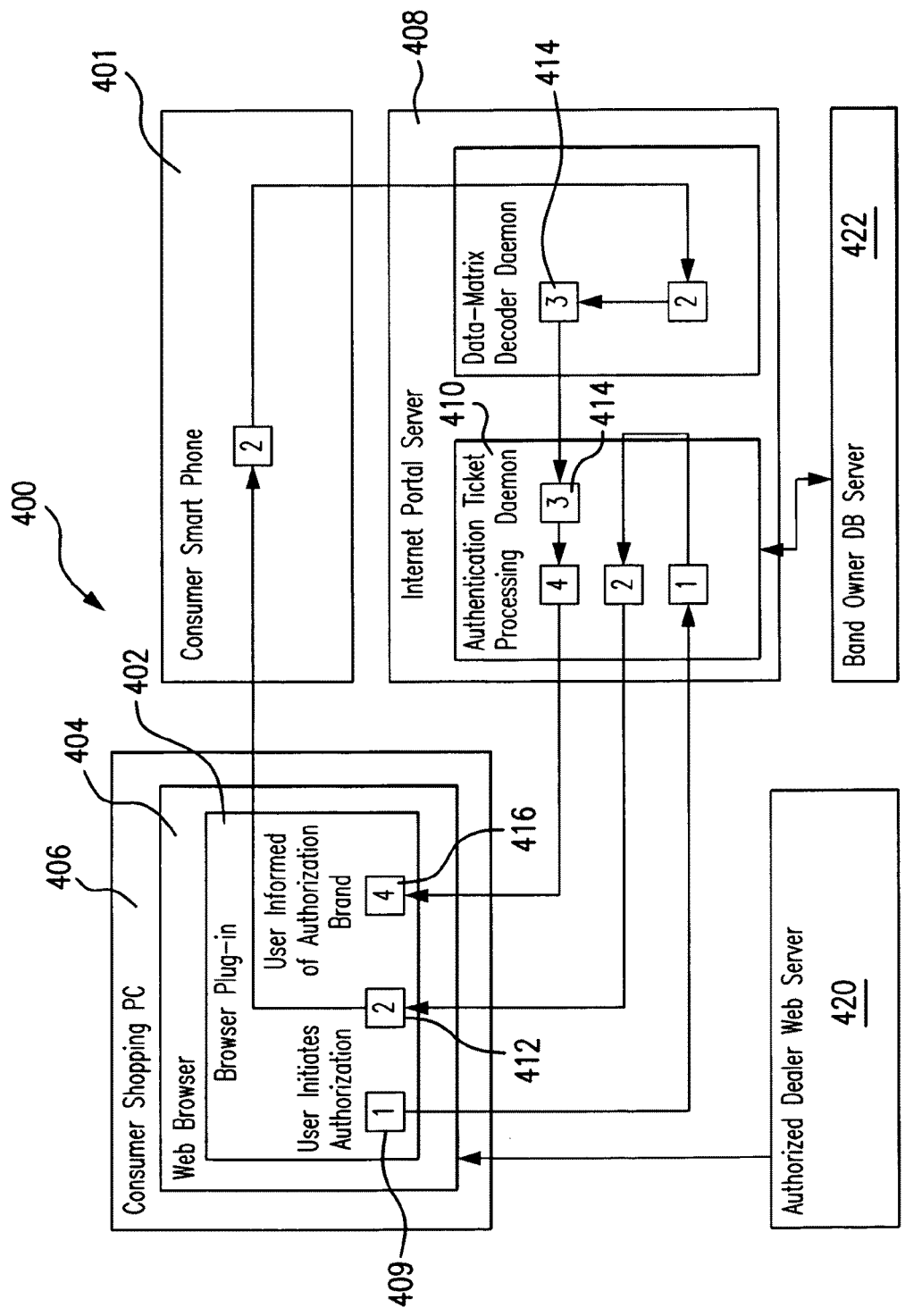
FIG. 23 is a schematic diagram of an Internet Retailer Authentication Protocol incorporating the instant invention.

A block diagram for high-level overview, and example, of a secure protocol 400 for authenticating Internet retailers, incorporating the instant invention, is shown in FIG. 23. Protocol 400 includes a consumer-owned smart phone 401 as a trusted communication link with the authentication network. The proposed system also utilizes a trusted authenticator web browser "plug-in" 402 of a web browser 404 of consumer's pc 406 to automate an authentication exchange with no user interaction, except for the user to initiate the authentication request. The design is immune to all conceivable attacks by a counterfeiter who wishes to deceive a consumer into believing that his unauthorized web store is selling authentic products. Security and trust is derived from the use of an alternate communication path (the consumer's smart phone), and the use of a signed and trusted authenticator web browser plug-in 402.

Authentication procedure begins when the consumer activates their trusted authenticator web-browser plug-in 402 for their PC 406 to send a data packet 407 requesting the initiation of the authentication protocol to an authenticator web portal server 408. This initiation request contains the domain-name of the internet site the consumer is shopping on, and the BRAND and product that the consumer is interested in purchasing and other pertinent information. An Authentication Ticket Processing Daemon (ATPD) 410 receives the request from plug-in 402 and generates an image 412 of unique IDENTIFIER 110. Data-matrix image 412 represents an "authentication ticket" of unique encoded data that can only be used once. Data-matrix image 412 is sent to web browser plug-in 402 and the user is presented with image 412 and asked to take a picture with their smart phone 401.

The user runs a signed & trusted authenticator smart-phone application and takes a picture of 2D data matrix image 412 which is uploaded (securely encrypted) to authenticator web portal server 408, where it is decoded into data packet 407 which includes a character data string 414. Data string 414 represents the single-use authentication ticket. ATPD 410 is: notified that the authentication ticket that it generated has been uploaded: determines if the authentication ticket data is valid; if the internet domain-name BRAND and product are actually authorized for retail sale; and sends a data packet 416 to web browser plug-in 402 containing the results of the authentication. Plug-in 402 generates a visual dialog on the consumer's PC 406 or on imagining device 401 to inform the consumer of the results. The authentication result includes, but is not necessarily limited to, a YES/NO answer as to whether the internet domain-name that the consumer is viewing is an AUTHORIZED dealer of the requested BRAND "SOURCES" products.

It should be noted that the purported Authorized Dealer Web Server 420 is not involved in the transaction. All communication takes place between authenticator's internet portal 408, authenticator browser plug-in 402, and consumer's smart phone 401. All three of these things are reasonably easy to secure and prevent sabotage by a counterfeiter. The described communication between authenticator internet portal server 408 and a BRAND "SOURCE" DB server 422 is also in communication by way of an interface 424 with ATPD 410. Interface 424 establishes a feasible and realistic way for the authenticators portals 408 to know (secure and trusted) which internet domain-names are AUTHORIZED dealers and of which BRAND "SOURCE" BRANDS and products.

The security and trust in system 400 is partly derived from the authenticity of authenticators web browser plug-in 402. Thus if a counterfeiter can sabotage the consumer's web browser plug-in (or create their own imitation plug-in), then the security of the system is compromised. Therefore the consumer must trust the web-browser plug-in, or the system is worthless. Fortunately, web browsers have been dealing with the integrity of plug-ins for years now, and there is considerable infrastructure already in place inside all web browsers that allow secure signing of plug-ins. Additionally, authenticator plug-in 402 can contain an obfuscated encryption key that counterfeiters and hackers will not know. This encryption key is used to encrypt and digitally-sign all communications between itself and the ATPD.

It is an easy matter for an authorized internet retailer to implement authenticator authentication on his their web site store. The only challenge is for the web pages to contain some additional HTML data that web-browser plug-in 402 will recognize to notify plug-in 402 of which BRANDS of BRAND "SOURCE" BRANDED products are for sale on a particular web page. There are a number of technical ways to do this, many of which require only a modest amount of effort on the part of the web site operator.

Figure 24:
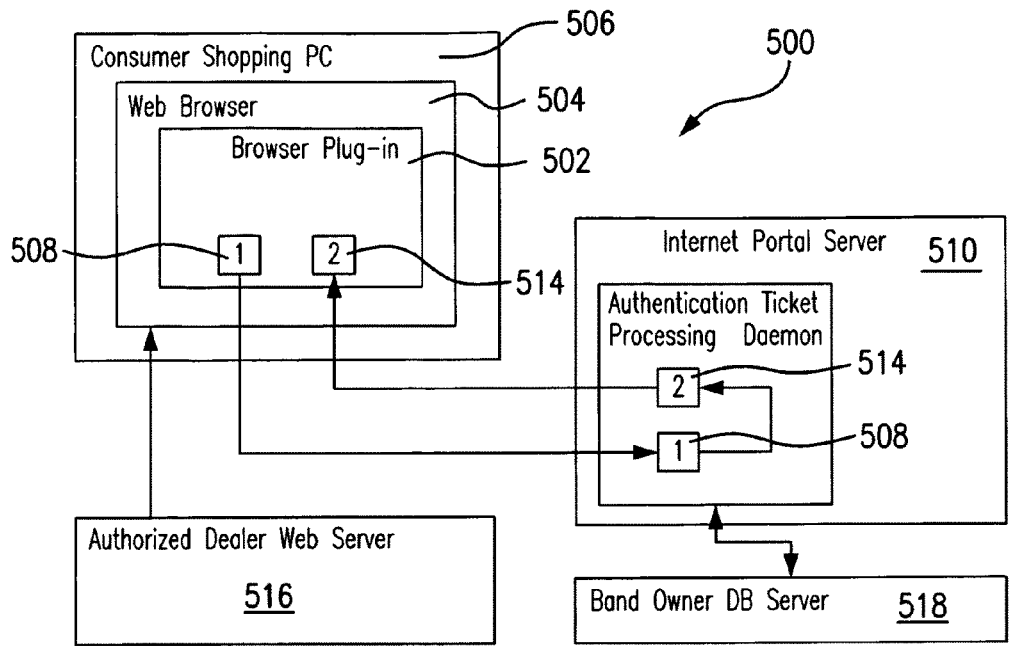
FIG. 24 is a schematic diagram of an alternate embodiment of an Internet Retailer Authentication Protocol incorporating the instant invention.

A block diagram, and example, of another secure protocol 500 for authenticating internet retailers, also incorporating the instant invention, is shown in FIG. 24. Protocol 500 is a simplified version of protocol 400 of FIG. 23. Simplified version 500 does not require a smart phone to capture a data-matrix 2D barcode image. Instead, the web browser plug-in manages the entire authentication procedure.

The proposed system also utilizes a trusted authenticator web browser "plug-in" 502 of a web browser 504 of consumer's pc 506 to automate an authentication exchange with no user interaction, except for the user to initiate the authentication request. The design is also immune to all conceivable attacks by a counterfeiter who wishes to deceive a consumer into believing that his unauthorized web store is selling authentic products. Security and trust is derived from the use of an alternate communication path, through the use of a signed and trusted authenticator web browser plug-in 502.

Authentication procedure begins when the consumer activates their trusted authenticator web-browser plug-in 502 for their PC 506 to send a data packet 508 requesting the initiation of the authentication protocol to an authenticator web portal server 510. This initiation request contains the domain-name of the internet site the consumer is shopping on, and the BRAND and product that the consumer is interested in purchasing and other pertinent information. The ATPD process determines if the domain-name is an AUTHORIZED retailer of the BRAND that the consumer is interested in buying and sends a data packet 514 to authenticator web browser plug-in 502 containing the results of the authentication. Plug-in 502, in turn and in real time, generates a visual dialog on the consumer's PC 506 to inform the consumer of the results. This includes a YES/NO answer as to whether the internet domain-name that the consumer is viewing is an AUTHORIZED dealer of the requested BRAND "SOURCES" products and/or services.

Protocol 500 would be best employed when the consumer is shopping on a camera equipped cell-phone browser, and therefore taking a photo of the entire identifier. It would also serve as a proactive rebuttal to potential copy-cat authenticator systems that attempt to claim that they can authenticate internet retails without requiring the consumer to own a smart phone.

Figure 25:
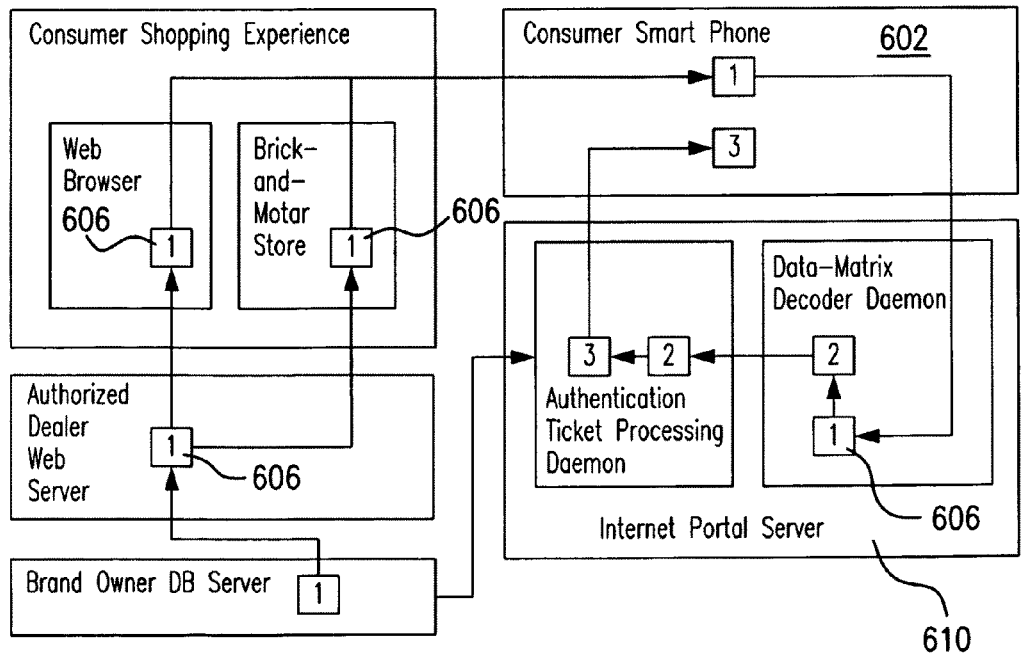
FIG. 25 is a schematic diagram of another embodiment of an Internet Retailer

Yet a further alternate embodiment of a protocol 600 (FIG. 25), incorporating the instant invention, is altogether different from either of protocols 400 and 500. Protocol 600 does not require the use of an Internet web browser, but instead relies completely on the use of a smart phone 602 and a 2D Data Matrix type barcode 604. Protocol 600 furthermore requires the consumer to manually verify the address where they are shopping (whether it is a physical street address, name and location of company or an Internet domain-name address).

Before authentication begins according to protocol 600, the BRAND "SOURCE" and the authenticator assign a 2D Data Matrix type barcode 604 representing the authorized retailing address (URL or street) and the BRAND name. An image 606 of barcode 604 is distributed to the web site of the respective retailer and/or posted on the door and/or, window or otherwise of a brick and mortar store of the respective dealer.

Authentication procedure using protocol 600 begins with consumer's smart phone 602, where the user activates an authentication phone application (not shown) takes a photo of the 2D Data Matrix type bar code image 606 and transmits image 606 to an authenticator server web portal 610 for decoding. Authenticator server web portal 610 processes and decodes image 606 to a text string and passes it to an authentication checking module 620 which looks up the text string in a database and generates a response packet containing the address (URL or street) and authorized BRAND "SOURCE" BRAND represented by the 2D data matrix string. Thereafter authenticator server 622 sends a response back to consumer smart phone 602 informing the consumer of the address and BRAND that is represented by the 2D Data Matrix type string that was photographed. The consumer can then verify that the address is actually where they are shopping. For Internet URL addresses, the consumer can verify the domain-name, and for brick and mortar storefronts the consumer can verify the street address.

Protocol 600 is especially useful when and if the consumer is shopping in a brick-and-mortar location and does not have a computer at their disposal to perform the authentication. It is also useful when and if the consumer is shopping online at an Internet retailer, but does not have (or chooses not to trust) a web-browser plug-in module.

What is claimed is:
1. Brand "source" authentication; comprising,
 a). A brand "source" identifier including:
  i). at least a first human observable surface;
  ii). authenticator indicia carried by said first human observable surface;
  iii). said authenticator indicia indicating the Brand "source" of the authenticator;
  iv). authentication indicia also carried by said identifier;
  v). said authentication indicia including at least encoded symbology which, when decoded, indicate the Brand "source" pertinent to the placement of said identifier; and
  vi). a selected portion of said identifier being usable to present said identifier for human observation to facilitate recognition of said authenticator indicia and verification of the Brand "source" authentication indicia;
 b). said authenticator providing a selected number of said identifiers upon request by the authentication Brand "source";

c). said authenticator receiving and storing, in an authenticator data storage, data concerning use of said selected number of said identifiers;

d). said authenticator furthermore receiving all requests for verification of authentication Brand "source" to enable said authenticator to advise an inquiring party of such verification or of the lack of same.

2. The Brand "source" authentication of claim 1 wherein said identifier may be imaged by a digital imaging device such as a digital camera, a camera equipped cell phone or smart phone or the like, with respective inputs to and outputs from the digital imaging device to be transmitted through the internet.

3. The Brand "source" authentication of claim 2 wherein transmission from the digital imaging device is to be to said authenticator.

4. The Brand "source" authentication of claim 3 including an authenticator virtual private network provided by the authenticator for the digital imaging device to facilitate transmission of the output from the digital imaging device to said authenticator.

5. The Brand "source" authentication of claim 4 wherein the digital imaging transmits the image to the authenticator for further processing.

6. The Brand "source" authentication of claim 5 wherein said authenticator further effects processing, including decoding, of the image, and determines from the authenticator data base that identifier encoded indicia so transmitted to said authenticator for authentication does or does not match identifier indicia stored in said authenticator data base.

7. The Brand "source" authentication of claim 6 wherein said authenticator transmits output received from said digital imaging device to the Brand "source" for authentication and is enabled to indicate to an inquirer authentication, or non-authentication, after receipt of same from the Brand "source".

8. The Brand "source" authentication of claim 7 wherein acceptance of the authenticator virtual private network for a digital imaging device establishes a communication link between said digital imaging device and said authenticator and Brand "source".

9. The Brand "source" authentication of claim 8 wherein said communication link permits transmission from the Brand "source" to the digital imaging device of marketing and advertising information.

10. The Brand "source" identifier of claim 7 wherein the placement of the identifier is to be upon an article the Brand "source" of which is to be authenticated.

11. The Brand "source" identifier of claim 10 wherein there are a multiplicity of such identifiers, and to be a multiplicity of such articles with placement of each such identifier to be upon a different one of such article(s) the Brand "source" of which are to be authenticated, and wherein said authentication indicia is different and unique for each individual article to which said identifiers are to be attached.

12. The Brand "source" identifier of claim 7 wherein said authentication indicia is of the 2D Data Matrix type and may/or may not be encrypted.

13. The Brand "source" identifier of claim 12 wherein said authentication indicia is applied by the use of a laser.

14. The Brand "source" identifier of claim 12 wherein said authentication indicia is direct part marked.

15. The Brand "source" identifier of claim 7 wherein said authentication indicia also includes encoded symbology with additional characterizations pertinent to the placement of the identifier.

16. The Brand "source" identifier of claim 7 wherein said authenticator indicia includes a Brand of the authenticator.

17. The Brand "source" identifier of claim 16 wherein said authenticator indicia also includes a Brand of the "source" pertinent to the placement of the identifier.

18. The Brand "source" identifier of claim 7 wherein the placement of the identifier is to be at a sales and/or service location the Brand "source" authorization of which is to be authenticated.

19. The Brand "source" identifier of claim 18 wherein there are a multiplicity of such identifiers, each to be placed at a different sales and/or service location the Brand "source" authorization of which are to be authenticated, and wherein said authentication indicia is different and unique for each individual identifier.

20. The Brand "source" identifier of claim 18 wherein said authentication indicia is of the 2D Data Matrix type.

21. The Brand "source" identifier of claim 20 wherein said authentication indicia is applied by the use of a laser.

22. The Brand "source" identifier of claim 20 wherein said authentication indicia is direct part marked.

23. The Brand "source" identifier of claim 20 wherein said authentication indicia also includes encoded symbology with additional characterizations pertinent to the placement of the identifier.

24. The Brand "source" identifier of claim 23 wherein said authenticator indicia includes a Brand of the authenticator.

25. The Brand "source" identifier of claim 24 wherein said authenticator indicia also includes a Brand of the "source" pertinent to the placement of the identifier.

* * * * *